(12) United States Patent
Kaikkonen et al.

(10) Patent No.: US 11,910,441 B2
(45) Date of Patent: Feb. 20, 2024

(54) PHYSICAL RANDOM ACCESS CHANNEL (PRACH) IN UNLICENSED SPECTRUM

(71) Applicant: NOKIA TECHNOLOGIES OY, Espoo (FI)

(72) Inventors: Jorma Johannes Kaikkonen, Oulu (FI); Timo Erkki Lunttila, Espoo (FI); Sami-Jukka Hakola, Kempele (FI); Jarkko Tuomo Koskela, Oulu (FI)

(73) Assignee: NOKIA TECHNOLOGIES OY, Espoo (FI)

(*) Notice: Subject to any disclaimer, the term of this patent is extended or adjusted under 35 U.S.C. 154(b) by 416 days.

(21) Appl. No.: 17/223,980

(22) Filed: Apr. 6, 2021

(65) Prior Publication Data

US 2022/0322445 A1 Oct. 6, 2022

(51) Int. Cl.
*H04W 4/00* (2018.01)
*H04W 16/14* (2009.01)

(52) U.S. Cl.
CPC ....... *H04W 74/0833* (2013.01); *H04W 16/14* (2013.01)

(58) Field of Classification Search
CPC .......................... H04W 74/0833; H04W 16/14
See application file for complete search history.

(56) References Cited

U.S. PATENT DOCUMENTS

| | | | | |
|---|---|---|---|---|
| 2017/0339721 A1* | 11/2017 | Mukherjee | .......... | H04W 72/566 |
| 2020/0281018 A1* | 9/2020 | Li | .......... | H04W 80/08 |
| 2020/0374960 A1* | 11/2020 | Deenoo | .......... | H04W 74/0833 |
| 2021/0014891 A1* | 1/2021 | Talarico | .......... | H04W 72/535 |

OTHER PUBLICATIONS

3GPP TR 36.889 V13.0.0 (Jun. 2015), Technical Report, 3rd Generation Partnership Project; Technical Specification Group Radio Access Network; Study on Licensed-Assisted Access to Unlicensed Spectrum; (Release 13), Jun. 2015.
3GPP TR 38.808 V1.0.0 (Dec. 2020), Technical Report, 3rd Generation Partnership Project; Technical Specification Group Radio Access Network; Study on supporting NR from 52.6 GHz to 71 GHZ (Release 17), Dec. 2020.
ETSI EN 301 893 V2.1.1 (May 2017), ETSI, Harmonised European Standard, 5 GHz RLAN; Harmonised Standard covering the essential requirements of article 3.2 of Directive 2014/53/EU, May 2017.
Draft ETSI EN 302 567 V2.2.0 (Dec. 2020), ETSI, Harmonised European Standard, Multiple-Gigabit/s radio equipment operating in the 60 GHz band; Harmonised Standard for access to radio spectrum, Dec. 2020.
Intel Corporation: "New SID: Study on supporting NR from 52.6GHz to 71 GHz," 3GPP, RP-193259, 3GPP TSG RAN Meeting #86, Sitges, Spain, Dec. 9-12, 2019.

(Continued)

*Primary Examiner* — Siren Wei
(74) *Attorney, Agent, or Firm* — SQUIRE PATTEN BOGGS (US) LLP

(57) ABSTRACT

Systems, methods, apparatuses, and computer program products for physical random access channel (PRACH) in unlicensed spectrum may be provided. For example, a configuration may be provided to a user equipment, where the configuration is related to using short control signaling exemption (SCSe) in connection with the management of uplink PRACH transmissions.

15 Claims, 4 Drawing Sheets

100

(56) References Cited

OTHER PUBLICATIONS

Intel Corporation: "Presentation of Report to TSG: TR 38.808 V100: Study on supporting NR from 52.6 GHz to 71 GHz," Tdoc RP-202254, 3GPP TSG-RAN Meeting #90-e, e-Meeting, Dec. 7-11, 2020.
CMCC: "Revised WID: Extending current NR operation to 71 GHz," 3GPP, RP-202925, 3GPP TSG RAN Meeting #90-e, Electronic Meeting, Dec. 7-11, 2020.
3GPP TS 37.213 V16.5.0 (Mar. 2021), Technical Specification, 3rd Generation Partnership Project; Technical Specification Group Radio Access Network; Physical layer procedures for shared spectrum channel access (Release 16), Mar. 2021.
3GPP TS 38.213 V16.5.0 (Mar. 2021), Technical Specification, 3rd Generation Partnership Project; Technical Specification Group Radio Access Network; NR; Physical layer procedures for control (Release 16), Mar. 2021.
3GPP TS 38.212 V16.5.0 (Mar. 2021), Technical Specification, 3rd Generation Partnership Project; Technical Specification Group Radio Access Network; NR; Multiplexing and channel coding (Release 16), Mar. 2021.
3GPP TS 38.331 V16.4.1 (Mar. 2021), Technical Specification, 3rd Generation Partnership Project; Technical Specification Group Radio Access Network; NR; Radio Resource Control (RRC) protocol specification (Release 16), Mar. 2021.

* cited by examiner

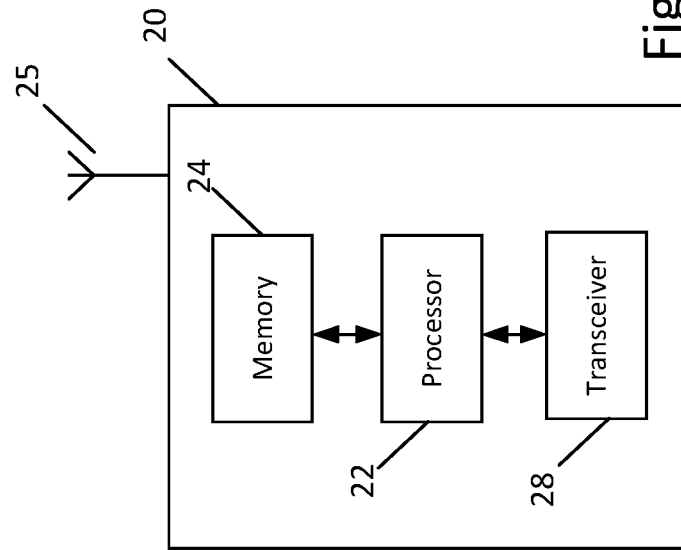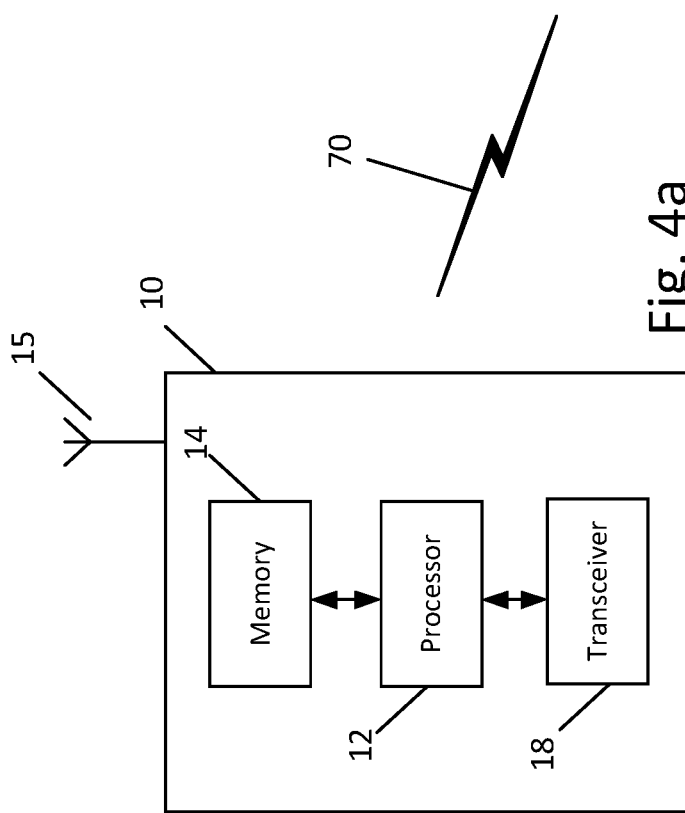

PHYSICAL RANDOM ACCESS CHANNEL (PRACH) IN UNLICENSED SPECTRUM

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for physical random access channel (PRACH) in unlicensed spectrum.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, an apparatus may include at least one processor and at least one memory including computer program code. The at least one memory and the computer program code may be configured to, with the at least one processor, cause the apparatus at least to transmit a configuration for uplink physical random access channel transmissions. The configuration may include an indication of one or more conditions for applying short control signaling exemption to the uplink physical random access channel transmissions. The at least one memory and the computer program code may be configured to, with the at least one processor, cause the apparatus at least to receive the uplink physical random access channel transmissions.

In a variant, the one or more conditions may include whether the short control signaling exemption can be applied to one or more random access channel occasions. In a variant, the configuration may be included in a physical downlink control channel order. In a variant, the one or more conditions may include whether the uplink physical random access channel transmissions are for one or more types of random access channel procedures for which the short control signaling exemption can be applied. In a variant, the one or more conditions may include a decision threshold including a value between 0 and 1. In a variant, the value may represent a statistical share of random access channel occasions for which the short control signaling exemption can be applied. In a variant, the one or more conditions may include a failure of a listen before talk procedure or a failure of a physical random access channel transmission during a time period. In a variant, the one or more conditions may include whether an uplink physical random access channel transmission is an initial transmission or a retransmission. In a variant, the one or more conditions may include whether a bitmap indicates that the short control signaling exemption can be applied to the uplink physical random access channel transmissions.

According to a second embodiment, an apparatus may include at least one processor and at least one memory including computer program code. The at least one memory and the computer program code may be configured to, with the at least one processor, cause the apparatus at least to receive a configuration for uplink physical random access channel transmissions. The configuration may include one or more conditions for applying short control signaling exemption to the uplink physical random access channel transmissions. The at least one memory and the computer program code may be configured to, with the at least one processor, cause the apparatus at least to determine whether the short control signaling exemption can be applied to the uplink physical random access channel transmissions based on the one or more conditions. The at least one memory and the computer program code may be configured to, with the at least one processor, cause the apparatus at least to, based on the determination, either transmit the uplink physical random access channel transmissions using the short control signaling exemption, or perform a listen before talk procedure and either transmit the uplink physical random access channel transmissions or determine to not transmit the uplink physical random access channel transmissions depending on a result of the listen before talk procedure.

In a variant, the at least one memory and the computer program code may be configured to, with the at least one processor, further cause the apparatus at least to determine the configuration and the one or more conditions for uplink random access channel occasions, select one or more of the uplink random access channel occasions based on a measurement, and the determining of whether the short control signaling exemption can be applied to the uplink physical random access channel transmissions may include determining whether the uplink physical random access channel transmissions can be transmitted on the one or more of the uplink random access channel occasions by applying the short control signaling exemption. In a variant, the at least one memory and the computer program code may be configured to, with the at least one processor, further cause the apparatus, when determining of whether the uplink physical random access channel transmissions can be transmitted on the one or more of the uplink random access channel occasions, at least to determine whether the uplink physical random access channel transmissions can be transmitted on the one or more of the uplink random access channel occasions based on a decision threshold comprising a value between 0 and 1. In a variant, the value may represent a statistical share of the uplink random access channel occasions for which the short control signaling exemption can be applied.

In a variant, the at least one memory and the computer program code may be configured to, with the at least one processor, further cause the apparatus, when determining whether the uplink physical random access channel transmissions can be transmitted on the one or more of the uplink random access channel occasions, at least to determine whether the uplink physical random access channel transmissions can be transmitted on the one or more of the uplink random access channel occasions based on whether the listen before talk procedure or a random access channel procedure first fails for the one or more of the uplink random access channel occasions. In a variant, the at least one memory and the computer program code may be configured to, with the at least one processor, further cause the apparatus, when determining whether the uplink physical random access channel transmissions can be transmitted on the one or more of the uplink random access channel occasions, at least to determine whether the uplink physical random access channel transmissions can be transmitted on the one or more of the uplink random access channel occasions based on whether an uplink physical random access channel transmission is an initial transmission or a retransmission.

In a variant, the at least one memory and the computer program code may be configured to, with the at least one processor, further cause the apparatus, when determining whether the uplink physical random access channel transmissions can be transmitted on the one or more of the uplink random access channel occasions, at least to determine whether the uplink physical random access channel transmissions can be transmitted on the one or more of the uplink random access channel occasions based on values of bits in a bitmap. In a variant, the bits included in the bit map may correspond to the uplink random access channel occasions. In a variant, the at least one memory and the computer program code may be configured to, with the at least one processor, further cause the apparatus, when determining whether the uplink physical random access channel transmissions can be transmitted on the one or more of the uplink random access channel occasions, at least to determine whether the uplink physical random access channel transmissions can be transmitted on the one or more of the uplink random access channel occasions based on one or more of a beam index, a random access channel occasion index, a slot index, a system frame number, or an identifier of the apparatus.

In a variant, the at least one memory and the computer program code may be configured to, with the at least one processor, further cause the apparatus at least to determine the configuration and the one or more conditions for uplink random access channel occasions, receive a physical downlink control channel order that triggers initiation of a random access channel procedure, and the determining of whether the short control signaling exemption can be applied to the uplink physical random access channel transmissions may include determining whether the uplink physical random access channel transmissions can be transmitted by applying the short control signaling exemption after receiving the physical downlink control channel trigger. In a variant, the at least one memory and the computer program code may be configured to, with the at least one processor, further cause the apparatus, when determining whether the uplink physical random access channel transmissions can be transmitted by applying the short control signaling exemption, at least to determine whether the uplink physical random access channel transmissions can be transmitted by applying the short control signaling exemption based on whether the random access channel procedure includes a contention based random access channel procedure or a contention free random access channel procedure.

In a variant, the at least one memory and the computer program code may be configured to, with the at least one processor, further cause the apparatus, when determining whether the uplink physical random access channel transmissions can be transmitted by applying the short control signaling exemption, at least to determine whether the uplink physical random access channel transmissions can be transmitted by applying the short control signaling exemption based on one or more physical random access channel mask index values in the physical downlink control channel order. In a variant, the at least one memory and the computer program code may be configured to, with the at least one processor, further cause the apparatus, when determining whether the uplink physical random access channel transmissions can be transmitted by applying the short control signaling exemption, at least to determine whether the uplink physical random access channel transmissions can be transmitted by applying the short control signaling exemption based on a transmission configuration indicator state of a control resource set associated with the physical downlink control channel order.

According to a third embodiment, a method may include transmitting a configuration for uplink physical random access channel transmissions. The configuration may include an indication of one or more conditions for applying short control signaling exemption to the uplink physical random access channel transmissions. The method may include receiving the uplink physical random access channel transmissions.

In a variant, the one or more conditions may include whether the short control signaling exemption can be applied to one or more random access channel occasions. In a variant, the configuration may be included in a physical downlink control channel order. In a variant, the one or more conditions may include whether the uplink physical random access channel transmissions are for one or more types of random access channel procedures for which the short control signaling exemption can be applied. In a variant, the one or more conditions may include a decision threshold including a value between 0 and 1. In a variant, the value may represent a statistical share of random access channel occasions for which the short control signaling exemption can be applied. In a variant, the one or more conditions may include a failure of a listen before talk procedure or a failure of a physical random access channel transmission during a time period. In a variant, the one or more conditions may include whether an uplink physical random access channel transmission is an initial transmission or a retransmission. In a variant, the one or more conditions may include whether a bitmap indicates that the short control signaling exemption can be applied to the uplink physical random access channel transmissions.

According to a fourth embodiment, a method may include receiving a configuration for uplink physical random access channel transmissions. The configuration may include one or more conditions for applying short control signaling exemption to the uplink physical random access channel transmissions. The method may include determining whether the short control signaling exemption can be applied to the uplink physical random access channel transmissions based on the one or more conditions. The method may include, based on the determination, either transmitting the uplink physical random access channel transmissions using the short control signaling exemption, or performing a listen before talk procedure and either transmitting the uplink physical random access channel transmissions or determining to not transmit the uplink physical random access channel transmissions depending on a result of the listen before talk procedure.

In a variant, the method may include determine the configuration and the one or more conditions for uplink random access channel occasions, selecting one or more of the uplink random access channel occasions based on a measurement, and the determining of whether the short control signaling exemption can be applied to the uplink physical random access channel transmissions may include determining whether the uplink physical random access channel transmissions can be transmitted on the one or more of the uplink random access channel occasions by applying the short control signaling exemption. In a variant, the determining of whether the uplink physical random access channel transmissions can be transmitted on the one or more of the uplink random access channel occasions may include determining whether the uplink physical random access channel transmissions can be transmitted on the one or more of the uplink random access channel occasions based on a decision threshold comprising a value between 0 and 1. In a variant, the value may represent a statistical share of the uplink random access channel occasions for which the short control signaling exemption can be applied.

In a variant, the determining of whether the uplink physical random access channel transmissions can be transmitted on the one or more of the uplink random access channel occasions may include determining whether the uplink physical random access channel transmissions can be transmitted on the one or more of the uplink random access channel occasions based on whether the listen before talk procedure or a random access channel procedure first fails for the one or more of the uplink random access channel occasions. In a variant, the determining of whether the uplink physical random access channel transmissions can be transmitted on the one or more of the uplink random access channel occasions may include determining whether the uplink physical random access channel transmissions can be transmitted on the one or more of the uplink random access channel occasions based on whether an uplink physical random access channel transmission is an initial transmission or a retransmission.

In a variant, the determining of whether the uplink physical random access channel transmissions can be transmitted on the one or more of the uplink random access channel occasions may include determining whether the uplink physical random access channel transmissions can be transmitted on the one or more of the uplink random access channel occasions based on values of bits in a bitmap. In a variant, the bits included in the bit map may correspond to the uplink random access channel occasions. In a variant, the determining of whether the uplink physical random access channel transmissions can be transmitted on the one or more of the uplink random access channel occasions may include determining whether the uplink physical random access channel transmissions can be transmitted on the one or more of the uplink random access channel occasions based on one or more of a beam index, a random access channel occasion index, a slot index, a system frame number, or an identifier of a user equipment.

In a variant, the method may include determining the configuration and the one or more conditions for uplink random access channel occasions, receiving a physical downlink control channel order that triggers initiation of a random access channel procedure, and the determining of whether the short control signaling exemption can be applied to the uplink physical random access channel transmissions may include determining whether the uplink physical random access channel transmissions can be transmitted by applying the short control signaling exemption after receiving the physical downlink control channel trigger. In a variant, the determining of whether the uplink physical random access channel transmissions can be transmitted by applying the short control signaling exemption may include determining whether the uplink physical random access channel transmissions can be transmitted by applying the short control signaling exemption based on whether the random access channel procedure includes a contention based random access channel procedure or a contention free random access channel procedure.

In a variant, the determining of whether the uplink physical random access channel transmissions can be transmitted by applying the short control signaling exemption may include determining whether the uplink physical random access channel transmissions can be transmitted by applying the short control signaling exemption based on one or more physical random access channel mask index values in the physical downlink control channel order. In a variant, the determining of whether the uplink physical random access channel transmissions can be transmitted by applying the short control signaling exemption may include determining whether the uplink physical random access channel transmissions can be transmitted by applying the short control signaling exemption based on a transmission configuration indicator state of a control resource set associated with the physical downlink control channel order.

A fifth embodiment may be directed to an apparatus that may include circuitry configured to cause the apparatus to perform the method according to the third embodiment or the fourth embodiment, or any of the variants of those embodiments discussed above.

A sixth embodiment may be directed to an apparatus that may include means for performing the method according to the third embodiment or the fourth embodiment, or any of the variants of those embodiments discussed above. Examples of the means may include one or more processors, memory, and/or computer program codes for causing the performance of the operation.

A seventh embodiment may be directed to a computer readable medium comprising program instructions stored thereon for causing an apparatus to perform at least the method according to the third embodiment or the fourth embodiment, or any of the variants of those embodiments discussed above.

An eighth embodiment may be directed to a computer program product encoding instructions for causing an apparatus to perform at least the method according to the third embodiment or the fourth embodiment, or any of the variants of those embodiments discussed above.

BRIEF DESCRIPTION OF THE DRAWINGS

For proper understanding of example embodiments, reference should be made to the accompanying drawings, wherein:

FIG. 4a illustrates an example block diagram of an apparatus, according to an embodiment; and FIG. 4b illustrates an example block diagram of an apparatus, according to another embodiment.

DETAILED DESCRIPTION

Figure 1:
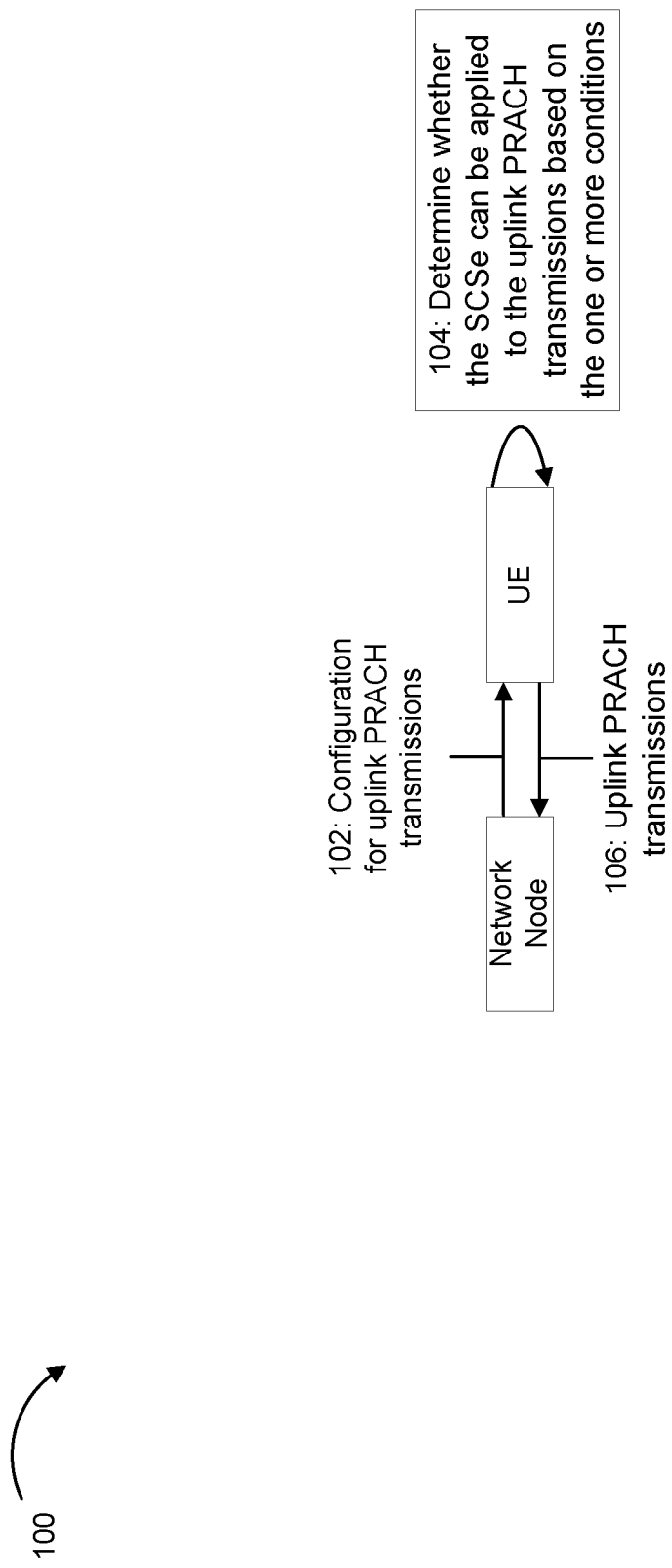
FIG. 1 illustrates an example of PRACH transmission in unlicensed spectrum, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for PRACH transmission in unlicensed spectrum is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar wording, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar wording, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

Aspects of NR may relate to 60 gigahertz (GHz) unlicensed frequency bands and PRACH transmissions and receptions. The regulations for operation on 60 GHz unlicensed spectrum may have to use a spectrum sharing or co-channel coexistence mechanism, but may not have to use any specific type of a mechanism. In some regions, separate regulatory requirements may be defined for different use cases or deployments, e.g., for fixed outdoor equipment or point-to-point communications, or for indoor-only use. One such mechanism is a listen-before-talk (LBT) procedure.

The LBT procedure may include a channel access method and means that a transmitter senses (measures energy on) a medium or channel before an intended transmission. If the transmitter determines that the medium is vacant, it may start its transmission. If the transmitter determines that the medium is occupied, it may defer or cancel the transmission. The determining may be based on comparing the measured received energy over a certain time period and over frequency resources against a defined energy detection threshold (ED). The determining may contain single or multiple measurements referred to as clear channel assessments (CCAs). As such, there may be multiple variants of the LBT procedure. In a type 1 LBT procedure, the transmitter may measure a channel to be free for a random number of occasions before accessing the channel. The random number may be uniformly distributed over a range referred to as a contention window. The contention window may be adjusted based on detected channel access collisions between multiple transmissions (e.g., type 1 LBT or category (Cat.) 4 LBT) or the contention window may be of fixed size (e.g., Cat. 3 LBT).

LBT measurements may be performed at least by the transmitter, but the LBT procedure may also incorporate measurements carried out at the receiver. In other words, the receiver may also monitor the channel access occupancy. At higher carrier frequencies where narrow beams are typically used, a directional LBT may be used as a channel access method. Thus, the transmitter may sense the medium or channel with more narrow beam than with omnidirectional or sector-wide beam. The subsequent transmission is then expected to take place using the same as, or a sub-beam of, the LBT beam.

Short control signaling exemption (SCSe) refers to a procedure where short control signals, which are control and management transmissions, are not subjected to the LBT procedure. Rather, short control signals can be transmitted without channel sensing so long as the total duration of the SCS transmission over a 100 millisecond (ms) observation interval does not exceed 10 percent (10%). For 60 GHz band, contention-exempt short control signaling transmission may be supported in regions where LBT is used and where short control signaling without LBT is permitted. If, however, regulations do not allow short control signaling exemption in a region when operating with LBT, operation with LBT for short control signals may have to be supported. In these cases, restrictions to the transmission, such as on duty cycle (airtime measured over a relatively long period of time), content, transmit (TX) power, etc. can be discussed when specifications are developed.

Aspects of NR may include random access channel (RACH) and transmission of PRACH preambles by the UE in the uplink. The PRACH may be used when the UE wants to communicate with the network and it does not have any uplink shared channel or control channel resources (physical uplink shared channel (PUSCH) or physical uplink control channel (PUCCH)) to transmit on, and/or when the UE's uplink transmission is unsynchronized. Furthermore, in NR, with beam-based operation, the PRACH may be used to assist the UE in finding a beam to communicate on with a gNB during initial access, handover, and/or during beam failure recovery.

Corresponding to multiple synchronization signal (SS) and physical broadcast channel (PBCH) block (SSB) locations within a half frame, NR may support receive beamforming for PRACH preamble reception by allocating multiple RACH occasions (ROs) (as used herein, "RO" may refer to RACH occasions or PRACH occasions, depending on context) for which a gNB may use different receive beams. PRACH occasion and PRACH preamble selection by the UE may also indicate the preferred SSB beam that may be used for message 2 (Msg2) or message 4 (Msg4) transmissions. This may be done by configuring an association between an SSB and one or more ROs and a set of PRACH preambles within each associated occasion. Based on the downlink (DL) measurements on SSBs, the UE may determine the ROs and PRACH preambles within the occasions associated to the selected SSBs from which the UE may select the preamble for the transmission. The UE may be allowed, in contention based random access (CBRA) to select ROs corresponding to any SSB which reference signal received power (RSRP) exceeds the configured threshold (e.g., the threshold rsrp-ThresholdSSB). In the case of contention free random access (CFRA), the UE can select any SSB (or channel state information reference signal (CSI-RS)) from the configured candidate list (candidate-BeamRSList) that exceeds the configured threshold.

The associations between SSBs and ROs and PRACH preambles within the occasions may be provided to the UE by remaining minimum system information (RMSI) for contention-based RACH or via dedicated signalling. The associations between SSBs and RACH resources may be based on the actually transmitted SSBs as indicated in system information block 1 (SIB 1). In a handover scenario, a source cell can indicate, in the handover command, the association between RACH resources and CSI-RS configuration(s), or the association between RACH resources and SSBs. In other words, for mobility, the association may be defined between CSI-RS resource(s) and RACH resources as well.

Random access preambles may be transmitted in PRACH occasions. A PRACH occasion may include a time-frequency resource used to transmit a preamble. Each RO has 64 preambles. The first preamble (preamble index 0) may correspond to cyclic shift 0 of the logic root sequence index given by the higher layer parameter prach-RootSequenceIndex. Subsequent preamble indices may be numbered first in increasing order of cyclic shift, and then increasing order of logical root indices, until all 64 preamble indices are obtained.

For an example of how SSBs are associated with ROs, the number of SSBs indicated to the UE as being transmitted may be 10 (e.g., $N_{Tx}^{SSB}=10$). The transmitted SSBs may have indices {0, 1, 8, 9, 16, 17, 24, 25, 32, 33}, and each SSB may be mapped to two ROs (e.g., N=½). The number of frequency division multiplexed ROs may be 2, the number of time domain ROs in one PRACH slot may be 3, and the number of PRACH slots in one PRACH configuration period may be 2. In this example, it may be assumed that the ROs are valid. Within one PRACH configuration period, there are ½×2×3×2=6 sets of preamble-indices and/or ROs to which SSBs can be mapped. As such, one PRACH configuration period may not be enough to map all SSBs, two PRACH configuration periods can map all SSBs, with the last 4 ROs in the second PRACH configuration period being left unused. In this example the association period is equal to two PRACH configuration periods. The association pattern may be long enough such that each SSB is associated at least once with a valid PRACH occasion. As the number of valid PRACH occasions in a RACH configuration period varies depending on the occurrence of SSBs and downlink symbols of the UL-DL time division duplex (TDD) configuration, the duration of the association pattern in terms of number of RACH configuration periods may vary. The association period pattern may include one or more association periods, such that it is a periodic pattern between SSBs and PRACH occasions, with a duration not exceeding 160 ms.

There may be two types of random access channel procedures: CBRA procedure, and CFRA procedure. In the CBRA procedure, multiple users may randomly select a preamble from a pool of preambles, and the contention resolution phase may determine which user, if any, had its data successfully received by the network. Contention resolution may resolve contention between two or more users selecting the same preamble. In the CFRA procedure, a preamble may be uniquely pre-allocated to the user, and there may be no possibility of preamble collision between users and no need for contention resolution.

Based on the above, it can be understood that SCSe allowance of 10% over 100 ms observation interval can be used for various types of control and management transmissions. In addition, SCSe transmissions may not have to be periodic and multiple SCSe transmissions may be allowed within the 100 ms observation interval as long as the 10% limit is not exceeded. The SCSe may be defined for an equipment, meaning that each device (UE and gNB) in a cell may be allowed to transmit SCSe up to 10% of the time. In the case of cellular system and several UEs attached to a cell, this may result in a significant amount of SCS transmissions. NR may allow SCSe for gNB or may define that the 10% SCS allowance is shared by all the devices (gNB, UEs) in the cell (e.g., concerning RACH). Transmitting selected signals or channels as SCSe transmissions may be desirable as 1) the signals may be important for communications, and 2) deterministic transmission time of the signals can be maintained when the channel access uncertainty is removed. Thus, there may be a need to allow NR unlicensed band (NR-U) to utilize short control signaling allowance for PRACHs while maintaining compliance with the operational limits, as well as fairness towards other nodes operating on the same spectrum. If SCSe is considered to be transmission node-specific (e.g., gNB and UE(s) can use it independently) in cellular type operation, this can result in excessive interference. Thus, there may be a need for the network to be able to control the interference caused by PRACH transmissions.

Some embodiments described herein may provide for PRACH in unlicensed spectrum. For example, certain embodiments may provide a configuration to a user equipment related to using SCSe in connection with the management of uplink PRACH transmissions. This may allow for efficient use of LBT-related exemptions (e.g., the 10% exemption allowance described above), thereby reducing latency associated with, e.g., uplink PRACH transmissions. In addition, certain embodiments may allow for a fair or even distribution of an SCSe allowance (e.g., 10%) between different beams, PRACH resources, and/or UEs (associated with SSB beams).

FIG. 1 illustrates an example 100 of PRACH transmission in unlicensed spectrum, according to some embodiments. As illustrated in FIG. 1, the example 100 includes a network node and a UE.

As illustrated at 102, the network node may transmit, and the UE may receive, a configuration for uplink PRACH transmissions. The configuration may include one or more conditions for applying SCSe to the uplink PRACH transmissions. Applying or using SCSe, as described herein, can include transmitting uplink RACH transmissions without performing an LBT procedure according to certain restrictions, such as the 10% limit described elsewhere herein.

In an example embodiment, the network node may configure the RACH occasions for which the UE can apply SCSe. The SCSe may be applied to a subset of ROs or to a subset of beams (e.g., to ROs and PRACH preambles associated with certain SSBs). The subset of beams or SSBs, and ROs and preambles, may change from one RACH association period to another (so that over time the ROs may be treated equally in terms of whether or not SCSe can be applied).

In another example embodiment, the network may indicate in a physical downlink control channel (PDCCH) order or configuration whether SCSe can be applied for a corresponding random access channel procedure. The control resource set (CORESET) pool index (CORESETpoolIndex), transmit receive point (TRP), transmission configuration index (TCI) state, or quasi-co-location (QCL) relation of the CORESET or PDCCH may be used by the UE to determine whether SCSe can be applied or if an LBT procedure is to be used for an uplink PRACH transmission.

In another example embodiment, the network node may indicate for which type of random access channel procedures SCSe can be applied. The type of random access channel procedure may be determined based on the RRC state of the UE at the point in time when the UE initiates a RACH procedure. For example, a UE in an RRC connected state may be allowed to use SCSe, but a UE in RRC idle mode may not be allowed to use SCSe, or vice versa. A type of random access channel procedure may be determined based on the connection establishment cause for performing the access to the network. For example, in a case where the UE makes an emergency call or performs RACH, the UE may be allowed to utilize SCSe, but in the case connection establishment is due to upper layer signalling, use of SCSe may not be allowed. The configuration may control whether SCSe can applied for a RACH procedure related to beam failure recovery (BFR), and/or for a RACH-based scheduling request (SR), which may account for time expired from the previous UL transmission, UL traffic priority, and/or the like.

In an example embodiment, the network node may configure and signal to the UE a decision threshold based on which the UE may determine whether it can apply an SCSe rule or if it has to apply LBT for the RO. In this case, the signalled value can be between, e.g., 0 and 1 and the value may indicate a statistical share of ROs for which the SCSe can be applied. The value may be controlled by the network node, thereby providing it with control over application of SCSe at the UE. For example, if the value is 0.6 the UE may generate a random number from a uniform distribution between 0 and 1. If the value is less than or equal to 0.6, the UE may apply the SCSe for the RO and may transmit a PRACH preamble without performing the LBT procedure. Otherwise, the UE may perform the LBT procedure before the transmission of the preamble.

In another example embodiment, the UE may be configured to first use ROs where the LBT procedure has to be performed over a certain amount of time (such as N association periods), and if the LBT procedure or the RACH fails, the UE may then be allowed to use RO resources where the SCSe can be applied. The selection between SCSe RO resources and the LBT RO resources can be split between access or traffic type that triggered the RACH procedure. In certain embodiments, the ROs for which SCSe may be used, or not used, may be determined based on whether a given PRACH transmission is an initial transmission or a retransmission. As an example, the first PRACH transmission attempt may be transmitted using the LBT procedure, but if the UE does not receive a response to that transmission, the subsequent PRACH re-transmissions may apply SCSe, or vice versa.

In another example embodiment, the network node may use different operations for the CBRA and CFRA resources. For instance, for CBRA resources, the above-described configured and signalled decision threshold value may be used, whereas for the CFRA resources, the network node may explicitly indicate whether the LBT procedure or the SCSe rule is applied.

In an example embodiment, the network node may configure a bitmap which indicates for which RO associated with a certain SSB a PRACH transmission can be transmitted using SCSe. For example the network node may choose ROs that belong to SSBs that are spatially closer to the cell center (further away from neighbor cells), which may minimize interference.

In another example embodiment, the network node may configure a subset of ROs (per SSB) for which SCSe may be used without performing the LBT procedure. For example, an RO may be configured such that a number of SSBs is indicated to the UE as being transmitted. This number may be, e.g., 10 (e.g., $N_{Tx}^{SSB}=10$), where the transmitted SSBs may have indices {0, 1, 8, 9, 16, 17, 24, 25, 32, 33}. Additionally, or alternatively, an RO may be configured such that each SSB is mapped to a certain number of ROs (e.g., two ROs, where N=½). Additionally, or alternatively, an RO may be configured such that there is a certain number of frequency division multiplexed ROs (e.g., 1 frequency division multiplexed RO). Additionally, or alternatively, an RO may be configured such that there is a certain number of time domain multiplexed ROs in one PRACH slot (e.g., 1 time domain multiplexed RO). Additionally, or alternatively, an RO may be configured such that there is a number of PRACH slots in one PRACH configuration period (e.g., 4 PRACH slots).

In an example embodiment, an SSB may be mapped to multiple ROs (e.g., two ROs) which may then be in different slots. The network node may then indicate slots on which SCSe can be applied (e.g., every second slot). There may be additional criteria based on which the UE may select whether it uses an LBT-based or SCSe-based RO.

In another example embodiment, if indicating SCSe applicability in the PDCCH order command, the network node may indicate within the PDCCH order whether PRACH ROs associated with a certain SSB can be transmitted using SCSe. In another embodiment, the network node may configure which RRC state(s) PRACH ROs associated with a certain SSB can be transmitted using SCSe. In another example embodiment, the network node may configure which connection establishment causes PRACH ROs associated with a certain SSB to be transmitted using SCSe.

As illustrated at 104, the UE may determine whether the SCSe can be applied to the uplink PRACH transmissions based on the one or more conditions. As illustrated at 106, the UE may transmit uplink PRACH transmissions. For example, the UE may transmit the uplink PRACH transmissions if, based on the determination at 104, the SCSe can be applied to the uplink PRACH transmission. If, however, the UE determines, at 104, that the SCSe cannot be applied to the uplink PRACH transmission, the UE may perform the LBT procedure. If the LBT procedure is successful (e.g., the LBT procedure indicates that a channel is clear), the UE may transmit the uplink PRACH transmissions, but if the LBT procedure is unsuccessful (e.g., the LBT procedure indicates that a channel is not clear), the UE may determine to not transmit the uplink PRACH transmissions.

In a first example embodiment related to the operations at 104 and/or 106, the UE may, based on a provided threshold value, determine whether or not SCSe may be applied for an RO. The UE may determine a PRACH configuration and one or more conditions based on which the UE may determine whether SCSe or an LBT procedure is to be used for an RO. The UE may measure SSBs and may select an RO based on the SSB measurements. Based on the conditions, the UE may determine whether a PRACH can be transmitted on the selected RO according to the SCSe, or with performing the LBT procedure. This determination may include the UE generating a random number between 0 and 1 from a uniform distribution. If the number is less than or equal to a predetermined threshold value (e.g., indicated by the network node), the UE may determine that the SCSe can be applied for the PRACH preamble transmission on the selected RO. Otherwise, the UE may determine that it needs to perform the LBT procedure before PRACH preamble transmission on the selected RO.

Additionally, or alternatively, the determination of whether a PRACH can be transmitted on the selected RO may include the UE first using ROs that use the LBT procedure over a certain time (such as N association periods) and, if the LBT procedure or RACH fails, the UE may be allowed to use RO resources where SCSe can be applied. The selection between the SCSe RO resources and the LBT procedure RO resources can be divided between access or traffic type that triggered the RACH procedure. Additionally, or alternatively, the determination of whether a PRACH can be transmitted on the selected RO may be based on whether the PRACH transmission is the first transmission or a retransmission. For example, for the first transmission, the LBT procedure may be used, but the subsequent transmission may apply SCSe.

Additionally, or alternatively, the determination of whether a PRACH can be transmitted on the selected RO may be based on a bitmap received from the network node, where each bit in the bitmap may correspond to an RO, and the value of the bit may indicate whether SCSe or the LBT procedure is to be used. Additionally, or alternatively, the determination of whether a PRACH can be transmitted on the selected RO may be based on, e.g., one or more of a beam index, an RO index, a slot index, a system frame number (SFN), and/or a UE identifier. For example, for a predefined portion of beams, ROs, slots, etc., SCSe may be used, where the predefined portion may be equal to, e.g., 1/N. In other words, every Nth PRACH may be transmitted using SCSe. The starting offset for the SCSe (e.g., the first PRACH that can be transmitted as SCS), can be determined based on the UE identifier, using a modulo operation (e.g., Mod(UE ID, M), where M may represent a positive integer and UE ID may represent a UE identifier), a configuration for the UE, or may be predefined. The UE may then perform either a PRACH preamble transmission based on the SCSe or the LBT procedure before the PRACH preamble transmissions, depending on the determination of whether the SCSe can be applied to the PRACH transmissions. If the UE performs the LBT procedure then, based on a positive result of the LBT procedure, the UE may transmit PRACH preambles.

In a second example embodiment related to the operations at 104 and/or 106, the UE may determine whether or not SCSe is applied for an RO based on the PDCCH order. For example, the UE may determine a PRACH configuration to be used. Alternatively, an RO configuration may control how the UE determines whether SCSe or the LBT procedure is to be used for a certain RO. The UE may then receive a PDCCH order from the network node that triggers the UE to initiate a RACH procedure. Based on conditions and/or configurations, the UE may determine whether to the SCSe can be applied. In some embodiments, PDCCH order triggered CBRA may have to be used in order to use the LBT procedure, whereas CFRA may use the SCSe. Additionally, or alternatively, certain PRACH mask index values (e.g., carried in the PDCCH order) may indicate whether SCSe or the LBT procedure can be applied. For example, the network node may preconfigure the corresponding split between PRACH mask index values. Additionally, or alternatively, the TCI state of the CORESET (e.g., QCL of the demodulation reference signal (DMRS) of the PDCCH order) may indicate to the UE whether to apply the LBT procedure or to use SCSe. The UE may then perform either a PRACH preamble transmission based on the SCSe or the LBT procedure before the PRACH preamble transmissions, depending on the determination of whether the SCSe can be applied to the PRACH transmissions. If the UE performs the LBT procedure then, based on the positive result of the LBT procedure, the UE may transmit PRACH preambles.

Although certain embodiments are described in the context of PRACH transmissions, certain embodiments may also apply equally to transmission of a message A (MsgA) data part in the case of a 2-step RACH procedure. Similarly, certain embodiments can be applied to Msg3 transmission to determine whether the LBT procedure has to be used or whether SCSe can be applied. In some embodiments, the network node may indicate in Msg2 whether the LBT procedure has to be applied. Certain embodiments may be applied to a UE in an RRC connected mode. For example, the UE may utilize SCSe if a decision threshold-based determination provides positive result, thereby indicating that the UE can utilize the SCSe.

As described above, FIG. 1 is provided as an example. Other examples are possible, according to some embodiments.

Figure 2:
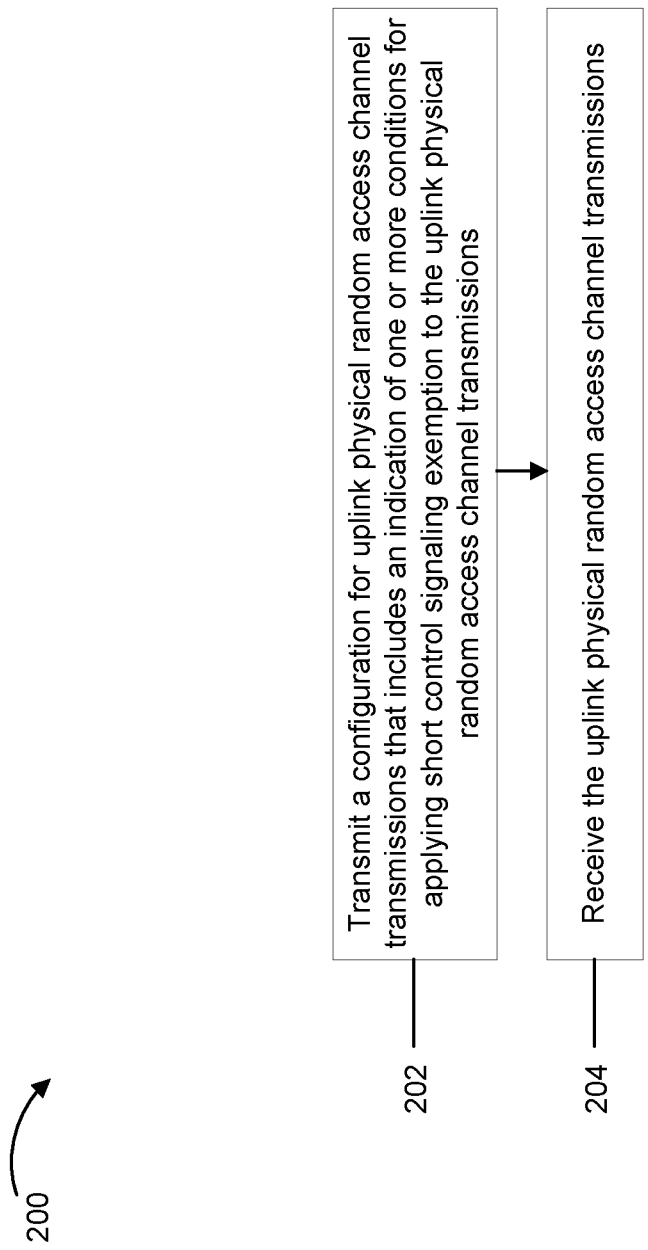
FIG. 2 illustrates an example flow diagram of a method, according to some embodiments.

FIG. 2 illustrates an example flow diagram of a method 200, according to some embodiments. For example, FIG. 2 may illustrate example operations of a network node (e.g., apparatus 10 illustrated in, and described with respect to, FIG. 4a). Some of the operations illustrated in FIG. 2 may be similar to some operations shown in, and described with respect to, FIG. 1.

In an embodiment, the method 200 may include, at 202, transmitting a configuration for uplink physical random access channel transmissions that includes an indication of one or more conditions for applying short control signaling exemption to the uplink physical random access channel transmissions, e.g., in a manner similar to that at 102 of FIG. 1. The method 200 may include, at 204, receiving the uplink physical random access channel transmissions, e.g., in a manner similar to that at 106 of FIG. 1.

The method illustrated in FIG. 2 may include one or more additional aspects described below or elsewhere herein. In some embodiments, the one or more conditions may include whether the short control signaling exemption can be applied to one or more random access channel occasions. In some embodiments, the configuration may be included in a physical downlink control channel order. In some embodiments, the method 200 may further include transmitting the physical downlink control channel order that triggers initiation of a random access channel procedure. In some embodiments, the one or more conditions may include whether the uplink physical random access channel transmissions are for one or more types of random access channel procedures for which the short control signaling exemption can be applied. In some embodiments, the one or more conditions may include a decision threshold comprising a value between 0 and 1. In some embodiments, the value may represent a statistical share of random access channel occasions for which the short control signaling exemption can be applied. In some embodiments, the one or more conditions may include a failure of a listen before talk procedure or a failure of a physical random access channel transmission during a time period. In some embodiments, the one or more conditions may include whether an uplink physical random access channel transmission is an initial transmission or a retransmission. In some embodiments, the one or more conditions may include whether a bitmap indicates that the short control signaling exemption can be applied to the uplink physical random access channel transmissions.

As described above, FIG. 2 is provided as an example. Other examples are possible according to some embodiments.

Figure 3:
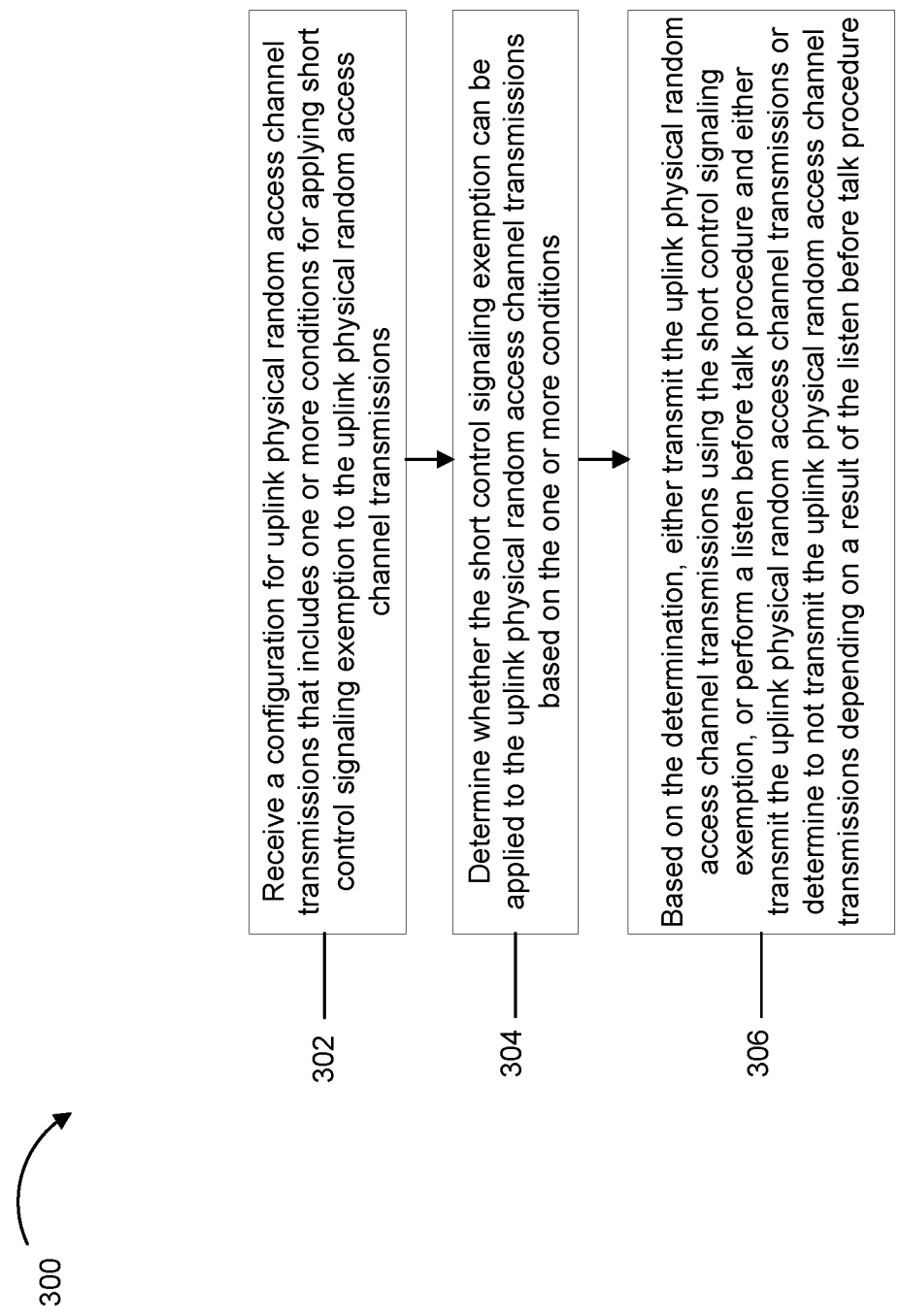
FIG. 3 illustrates an example flow diagram of a method, according to some embodiments.

FIG. 3 illustrates an example flow diagram of a method 300, according to some embodiments. For example, FIG. 3 may illustrate example operations of a UE (e.g., apparatus 20 illustrated in, and described with respect to, FIG. 4b). Some of the operations illustrated in FIG. 3 may be similar to some operations shown in, and described with respect to, FIG. 1.

In an embodiment, the method 300 may include, at 302, receiving a configuration for uplink physical random access channel transmissions that includes one or more conditions for applying short control signaling exemption to the uplink physical random access channel transmissions, e.g., in a manner similar to that at 102 of FIG. 1. The method 300 may include, at 304, determining whether the short control signaling exemption can be applied to the uplink physical random access channel transmissions based on the one or more conditions, e.g., in a manner similar to that at 104 of FIG. 1. The method 300 may include, at 306, based on the determination at 304, either transmitting the uplink physical random access channel transmissions using the short control signaling exemption, or performing a listen before talk procedure and either transmit the uplink physical random access channel transmissions or determine to not transmit the uplink physical random access channel transmissions depending on a result of the listen before talk procedure. For example, the operations illustrated at 306 may be performed in a manner similar to that at 106 of FIG. 1.

The method illustrated in FIG. 3 may include one or more additional aspects described below or elsewhere herein. In some embodiments, the method 300 may further include determining the configuration and the one or more conditions for uplink random access channel occasions, selecting one or more of the uplink random access channel occasions based on a measurement, and the determining at 304 may include determining whether the uplink physical random access channel transmissions can be transmitted on the one or more of the uplink random access channel occasions by applying the short control signaling exemption. In some embodiments, the determining at 304 may include determining whether the uplink physical random access channel transmissions can be transmitted on the one or more of the uplink random access channel occasions based on a decision threshold comprising a value between 0 and 1. In a variant, the value may represent a statistical share of the uplink random access channel occasions for which the short control signaling exemption can be applied. In a variant, the determining at 304 may include determining whether the uplink physical random access channel transmissions can be transmitted on the one or more of the uplink random access channel occasions based on whether the listen before talk procedure or a random access channel procedure first fails for the one or more of the uplink random access channel occasions. In some embodiments, the determining at 304 may include determining whether the uplink physical random access channel transmissions can be transmitted on the one or more of the uplink random access channel occasions based on whether an uplink physical random access channel transmission is an initial transmission or a retransmission. In some embodiments, the determining at 304 may include determining whether the uplink physical random access channel transmissions can be transmitted on the one or more of the uplink random access channel occasions based on values of bits in a bitmap. In some embodiments, the bits included in the bitmap may correspond to the uplink random access channel occasions. In some embodiments, the determining at 304 may include determining whether the uplink physical random access channel transmissions can be transmitted on the one or more of the uplink random access channel occasions based on one or more of a beam index, a random access channel occasion index, a slot index, a system frame number, or an identifier of the apparatus.

In some embodiments, the method 300 may include determining the configuration and the one or more conditions for uplink random access channel occasions, receiving a physical downlink control channel order that triggers initiation of a random access channel procedure, and the determining at 304 may include determining whether the uplink physical random access channel transmissions can be transmitted by applying the short control signaling exemption after receiving the physical downlink control channel trigger. In some embodiments, the determining at 304 may include determining whether the uplink physical random access channel transmissions can be transmitted by applying the short control signaling exemption based on whether the random access channel procedure includes a contention based random access channel procedure or a contention free random access channel procedure. In some embodiments, the determining at 304 may include determining whether the uplink physical random access channel transmissions can be transmitted by applying the short control signaling exemption based on one or more physical random access channel mask index values in the physical downlink control channel order. In some embodiments, the determining at 304 may include determining whether the uplink physical random access channel transmissions can be transmitted by applying the short control signaling exemption based on a transmission configuration indicator state of a control resource set associated with the physical downlink control channel order.

In some embodiments, the one or more conditions may include whether the short control signaling exemption can be applied to one or more random access channel occasions. In some embodiments, the configuration may be included in a physical downlink control channel order. In some embodiments, the one or more conditions may include whether the uplink physical random access channel transmissions are for one or more types of random access channel procedures for which the short control signaling exemption can be applied. In some embodiments, the one or more conditions may include a decision threshold comprising a value between 0 and 1. In some embodiments, the value may represent a statistical share of random access channel occasions for which the short control signaling exemption can be applied. In some embodiments, the one or more conditions may include a failure of a listen before talk procedure or a failure of a physical random access channel transmission during a time period. In a variant, the one or more conditions may include whether an uplink physical random access channel transmission is an initial transmission or a retransmission. In some embodiments, the one or more conditions may include whether a bitmap indicates that the short control signaling exemption can be applied to the uplink physical random access channel transmissions.

As described above, FIG. 3 is provided as an example. Other examples are possible according to some embodiments.

FIG. 4a illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), and/or a WLAN access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 4a.

As illustrated in the example of FIG. 4a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations illustrated in, or described with respect to, FIGS. 1 and 2. For instance, apparatus 10 may be controlled by memory 14 and processor 12 to perform the method of FIG. 2.

FIG. 4b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 4b.

As illustrated in the example of FIG. 4b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with any of the embodiments described herein, such as some operations illustrated in, or described with respect to, FIGS. 1 and 3. For instance, in one embodiment, apparatus 20 may be controlled by memory 24 and processor 22 to perform the method of FIG. 3.

In some embodiments, an apparatus (e.g., apparatus 10 and/or apparatus 20) may include means for performing a method or any of the variants discussed herein, e.g., a method described with reference to FIG. 2 or 3. Examples of the means may include one or more processors, memory, and/or computer program code for causing the performance of the operation.

Therefore, certain example embodiments provide several technological improvements, enhancements, and/or advantages over existing technological processes. For example, one benefit of some example embodiments is efficient use of LBT-related exemptions (e.g., the 10% exemption allowance described above), thereby reducing latency associated with, e.g., uplink PRACH transmissions. In addition, certain embodiments may allow for a fair or even distribution of an SCSe allowance (e.g., 10%) between different beams, PRACH resources, and/or UEs (associated with SSB beams). Accordingly, the use of some example embodiments results in improved functioning of communications networks and their nodes and, therefore constitute an improvement at least to the technological field of SCSe-based and LBT-based transmissions, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural wording is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

| PARTIAL GLOSSARY | |
|---|---|
| BFR | Beam failure recovery |
| CBRA | Contention Based Random Access |
| CFRA | Contention Free Random Access |
| DL | Downlink |
| DRS | Discovery Reference Signals |
| gNb | 5G Node B |
| LBT | Listen Before Talk |
| PBCH | Physical Broadcast Channel |
| PRACH | Physical Random Access Channel |
| RO | RACH Occasion |
| SCS | Short Control Signaling |
| SCSe | Short Control Signaling Exemption |
| SR | Scheduling Request |
| SS | Synchronization Signal |
| SSB | Synchronization Signal Block |
| UE | User Equipment |
| UL | Uplink |

We claim:

1. An apparatus, comprising:
   at least one processor; and
   at least one memory including computer program code,
   wherein the at least one memory and the computer program code are configured to, with the at least one processor, cause the apparatus at least to:
      transmit a configuration for uplink physical random access channel transmissions, wherein the configuration comprises an indication of one or more conditions for applying short control signaling exemption to the uplink physical random access channel transmissions; and
      receive the uplink physical random access channel transmissions, wherein
      the one or more conditions comprise at least one of:
         whether the short control signaling exemption can be applied to one or more random access channel occasions,
         a decision threshold comprising a value between 0 and 1, the value represents a statistical share of random access channel occasions for which the short control signaling exemption can be applied,
         a failure of a listen before talk procedure or a failure of a physical random access channel transmission during a time period,
         whether an uplink physical random access channel transmission is an initial transmission or a retransmission, or
         whether a bitmap indicates that the short control signaling exemption can be applied to the uplink physical random access channel transmissions.

2. The apparatus according to claim 1, wherein the configuration is included in a physical downlink control channel order.

3. The apparatus according to claim 1, wherein the one or more conditions comprise whether the uplink physical random access channel transmissions are for one or more types of random access channel procedures for which the short control signaling exemption can be applied.

4. An apparatus, comprising:
   at least one processor; and
   at least one memory including computer program code,
   wherein the at least one memory and the computer program code are configured to, with the at least one processor, cause the apparatus at least to:
      receive a configuration for uplink physical random access channel transmissions, wherein the configuration comprises one or more conditions for applying short control signaling exemption to the uplink physical random access channel transmissions;
      determine whether the short control signaling exemption can be applied to the uplink physical random access channel transmissions based on the one or more conditions; and
      based on the determination, either:
         transmit the uplink physical random access channel transmissions using the short control signaling exemption, or
         perform a listen before talk procedure and either transmit the uplink physical random access channel transmissions or determine to not transmit the uplink physical random access channel transmissions depending on a result of the listen before talk procedure.

5. The apparatus according to claim 4, wherein the at least one memory and the computer program code are configured to, with the at least one processor, further cause the apparatus at least to:
   determine the configuration and the one or more conditions for uplink random access channel occasions;
   select one or more of the uplink random access channel occasions based on a measurement; and
   wherein the at least one memory and the computer program code are configured to, with the at least one processor, further cause the apparatus, when determining whether the short control signaling exemption can be applied to the uplink physical random access channel transmissions, at least to:
      determine whether the uplink physical random access channel transmissions can be transmitted on the one or more of the uplink random access channel occasions by applying the short control signaling exemption.

6. The apparatus according to claim 5, wherein the at least one memory and the computer program code are configured to, with the at least one processor, further cause the apparatus, when determining whether the uplink physical random access channel transmissions can be transmitted on the one or more of the uplink random access channel occasions, at least to:
   determine whether the uplink physical random access channel transmissions can be transmitted on the one or more of the uplink random access channel occasions based on a decision threshold comprising a value between 0 and 1, wherein the value represents a statistical share of the uplink random access channel occasions for which the short control signaling exemption can be applied.

7. The apparatus according to claim 5, wherein the at least one memory and the computer program code are configured to, with the at least one processor, further cause the apparatus, when determining whether the uplink physical random access channel transmissions can be transmitted on the one or more of the uplink random access channel occasions, at least to:
   determine whether the uplink physical random access channel transmissions can be transmitted on the one or more of the uplink random access channel occasions based on whether the listen before talk procedure or a random access channel procedure first fails for the one or more of the uplink random access channel occasions.

8. The apparatus according to claim 5, wherein the at least one memory and the computer program code are configured to, with the at least one processor, further cause the apparatus, when determining whether the uplink physical random access channel transmissions can be transmitted on the one or more of the uplink random access channel occasions, at least to:
   determine whether the uplink physical random access channel transmissions can be transmitted on the one or more of the uplink random access channel occasions based on whether an uplink physical random access channel transmission is an initial transmission or a retransmission.

9. The apparatus according to claim 5, wherein the at least one memory and the computer program code are configured to, with the at least one processor, further cause the apparatus, when determining whether the uplink physical random access channel transmissions can be transmitted on the one or more of the uplink random access channel occasions, at least to:

determine whether the uplink physical random access channel transmissions can be transmitted on the one or more of the uplink random access channel occasions based on values of bits in a bitmap, wherein the bits included in the bit map correspond to the uplink random access channel occasions.

10. The apparatus according to claim 5, wherein the at least one memory and the computer program code are configured to, with the at least one processor, further cause the apparatus, when determining whether the uplink physical random access channel transmissions can be transmitted on the one or more of the uplink random access channel occasions, at least to:
determine whether the uplink physical random access channel transmissions can be transmitted on the one or more of the uplink random access channel occasions based on one or more of a beam index, a random access channel occasion index, a slot index, a system frame number, or an identifier of the apparatus.

11. The apparatus according to claim 4, wherein the at least one memory and the computer program code are configured to, with the at least one processor, further cause the apparatus at least to:
determine the configuration and the one or more conditions for uplink random access channel occasions;
receive a physical downlink control channel order that triggers initiation of a random access channel procedure; and
wherein the at least one memory and the computer program code are configured to, with the at least one processor, further cause the apparatus, when determining whether the short control signaling exemption can be applied to the uplink physical random access channel transmissions, at least to:
determine whether the uplink physical random access channel transmissions can be transmitted by applying the short control signaling exemption after receiving the physical downlink control channel trigger.

12. The apparatus according to claim 11, wherein the at least one memory and the computer program code are configured to, with the at least one processor, further cause the apparatus, when determining whether the uplink physical random access channel transmissions can be transmitted by applying the short control signaling exemption, at least to:
determine whether the uplink physical random access channel transmissions can be transmitted by applying the short control signaling exemption based on whether the random access channel procedure comprises a contention based random access channel procedure or a contention free random access channel procedure.

13. The apparatus according to claim 11, wherein the at least one memory and the computer program code are configured to, with the at least one processor, further cause the apparatus, when determining whether the uplink physical random access channel transmissions can be transmitted by applying the short control signaling exemption, at least to:
determine whether the uplink physical random access channel transmissions can be transmitted by applying the short control signaling exemption based on one or more physical random access channel mask index values in the physical downlink control channel order.

14. The apparatus according to claim 11, wherein the at least one memory and the computer program code are configured to, with the at least one processor, further cause the apparatus, when determining whether the uplink physical random access channel transmissions can be transmitted by applying the short control signaling exemption, at least to:
determine whether the uplink physical random access channel transmissions can be transmitted by applying the short control signaling exemption based on a transmission configuration indicator state of a control resource set associated with the physical downlink control channel order.

15. A method, comprising:
receiving a configuration for uplink physical random access channel transmissions, wherein the configuration comprises one or more conditions for applying short control signaling exemption to the uplink physical random access channel transmissions;
determining whether the short control signaling exemption can be applied to the uplink physical random access channel transmissions based on the one or more conditions; and
based on the determination, either:
transmitting the uplink physical random access channel transmissions using the short control signaling exemption, or
performing a listen before talk procedure and either transmitting the uplink physical random access channel transmissions or determining to not transmit the uplink physical random access channel transmissions depending on a result of the listen before talk procedure.

* * * * *